(12) United States Patent
Valentinsson

(10) Patent No.: US 6,444,149 B1
(45) Date of Patent: Sep. 3, 2002

(54) PROCESS FOR THE MANUFACTURING OF AN ARTICLE OF PLASTIC MATERIAL

(75) Inventor: Anders Valentinsson, Färlöv (SE)

(73) Assignee: Perstorp AB (SE)

( * ) Notice: Subject to any disclaimer, the term of this patent is extended or adjusted under 35 U.S.C. 154(b) by 0 days.

(21) Appl. No.: 09/380,313

(22) PCT Filed: Feb. 27, 1998

(86) PCT No.: PCT/SE98/00352

§ 371 (c)(1),
(2), (4) Date: Aug. 31, 1999

(87) PCT Pub. No.: WO98/40196

PCT Pub. Date: Sep. 17, 1998

(30) Foreign Application Priority Data

Mar. 10, 1997 (SE) ................................................ 9700835

(51) Int. Cl.⁷ .......................... B29C 44/06; B29C 44/12; B29C 49/04

(52) U.S. Cl. ...................... 264/45.9; 264/46.4; 264/514; 264/516; 264/571; 264/573

(58) Field of Search ................................ 428/71, 903.3; 264/572, 46.6, 516, 46.4, 45.9, 514, 571, 573

(56) References Cited

U.S. PATENT DOCUMENTS

| | | | | |
|---|---|---|---|---|
| 4,968,474 A | * | 11/1990 | Ito | 264/572 |
| 5,093,053 A | * | 3/1992 | Eckardt et al. | 264/572 |
| 5,217,800 A | * | 6/1993 | Pentecost | 428/283 |
| 5,328,651 A | * | 7/1994 | Gallagher et al. | 264/45.9 |
| 5,366,674 A | * | 11/1994 | Hattori et al. | 264/46.6 |
| 5,401,456 A | * | 3/1995 | Alesi et al. | 264/511 |
| 5,500,179 A | * | 3/1996 | Onishi et al. | 264/516 |
| 5,527,581 A | * | 6/1996 | Sugawara et al. | 428/71 |
| 6,174,470 B1 | * | 1/2001 | Plymale et al. | 264/46.4 |
| 6,251,320 B1 | * | 6/2001 | Hansel et al. | 264/45.9 |
| 6,268,037 B1 | * | 7/2001 | Butler et al. | 264/259 |

FOREIGN PATENT DOCUMENTS

| | | |
|---|---|---|
| DE | 4024274 | 2/1992 |
| JP | 63280609 | 11/1988 |
| JP | 3090330 | 4/1991 |
| JP | 701502 | 1/1995 |
| JP | 7080885 | 3/1995 |
| JP | 8090697 | 4/1996 |
| WO | 9513938 | 5/1995 |

* cited by examiner

*Primary Examiner*—Allan R. Kuhns

(57) ABSTRACT

Article made of thermoplastic material, which article is rigid and at least partly heat insulating. The article includes a laminate in at least parts of the article. The laminate includes a first and a second layer of solid thermoplastic material (A) and an intermediate layer of expanded thermoplastic material (B) with an average density of 50–800 kg/m³. The thermoplastic materials (A) and (B) are the same or compatible materials. The article is manufactured according to a process comprising the steps a) forming of a solid outer layer, b) manufacturing of an intermediate expanded layer and c) the appendage of functional parts such as reinforcing profiles, guiding profiles, stacking profiles, hinge parts, pockets, label holders, profiles or holes for automatic handling, locking devices or the like.

23 Claims, No Drawings

PROCESS FOR THE MANUFACTURING OF AN ARTICLE OF PLASTIC MATERIAL

The present invention relates to an article made of plastic material, which article at least partly includes a laminate which comprises a layer of expanded plastic material, and the process for manufacturing such an article.

Articles made of plastic material with a heat insulating ability have been commonly known for a long time. One example of such an article are containers made of expanded thermoplastic styrene, so-called styro-foam containers. These containers are excellent as heat insulators but have a very poor mechanical stability which will give them the characteristics of a disposable package. The surface of these containers is furthermore porous, which will make them rather difficult to keep clean. They are therefore less suited for use in the food supply industry.

Another type of articles made of plastic material is the rotation moulded plastic pallet. Initially a skin of solid thermoplastic material such as polyethylene or polypropylene is manufactured. The skin is after cooling filled with an expanded thermosetting polymer, most often polyurethane. Surf boards are also manufactured by this procedure. The reason for the use of expanded polymer is not the insulating effect in these cases, but the stabilising effect that will be obtained.

Yet another type of articles made of plastic material, are manufactured by blow moulding. These can be made twin-walled with an intermediate hollow space. Compost receptacles can be mentioned as an example of such articles. The hollow space can be filled with an expanded polymer if an increased heat insulating ability is desired. Normally a thermosetting material of polyurethane will be used.

One disadvantage with these processes is that the articles obtained will be impossible to recycle by material recovery since the materials used are not compatible. It is also difficult to provide the articles with well defined functional parts such as reinforcing profiles, guiding profiles, stacking profiles, hinge parts, pockets, label holders, profiles or holes for automatic handling, locking devices or the like, due to the coarse manufacturing tolerances allowed by these processes. It is therefore possible to use these processes for ordinary articles only since functions provided by functional parts as for example in a collapsible pallet container are impossible to manufacture.

It is desirable to achieve re-cyclable, heat insulating and rigid articles made of plastic material, that additionally are manufactured with the same accurate tolerance and functionality that can be achieved by traditional injection moulding. It is possible to achieve the above mentioned desires according to the present invention, whereby a recyclable article made of plastic material, which article is provided with an even and dense surface, an insulating and/or stabilising inner layer and well defined functional parts, can be manufactured. Accordingly, the invention relates to an article made of plastic material, preferably a transport and/or storage article such as a pallet, a pallet collar, a pallet container, a receptacle, a container, a crate, a compost receptacle, a waste receptacle or the like. The article is rigid and at least partly heat insulating and is manufactured of a thermoplastic material selected from a group consisting of polyethylene, polypropylene, polybutene, polyvinylchloride, polyalkylene-terephthalate, polystyrene, acrylonitrile-butadiene-styrene co-polymer or the like. The article includes laminate parts in at least parts of the article. The invention is characterised in that the laminate parts comprise a first and a second outer layer of a solid thermoplastic material A and an intermediate layer of a expanded thermoplastic material B with an average density of 50–800 kg/m$^3$. Together, the layers form a laminate. The thermoplastic materials A and B are the same or compatible materials, whereby a re-cyclable plastic article is obtained.

The article is preferably provided with functional parts such as reinforcing profiles, guiding profiles, stacking profiles, hinge parts, pockets, label holders, profiles or holes for automatic handling, locking devices or the like. The functional parts are applied on the article by welding, confounding, screwing, riveting, gluing or snap-in joining. The functional parts are manufactured from a thermoplastic material included in the same group as the thermoplastic material A and B.

The first and the second layer, which together form a massive outer layer of the thermoplastic material A, is preferably manufactured by extruding the thermoplastic material A into a pre-formed work piece, which extruded work piece is provided with a desired shape by vacuum forming and/or blow moulding. Alternatively the first and second layer sre manufactured by the process of gas assisted injection moulding. The intermediate expanded layer of the thermoplastic material B is manufactured together with the extruding of the first and the second outer layer of the thermoplastic material A which together form the work piece, or by filling a hollow space between the first and the second outer layer with the expanded thermoplastic material B by injection moulding. The functional parts are suitably integrated with the plastic article by injection moulding, press moulding, welding, confounding, gluing, riveting, screwing, snap-in joining or the like.

The article made of plastic material is suitably manufactured through a process including the steps;

a) forming of a solid outer layer, b) manufacturing of an intermediate expanded layer and, c) the appendage of functional parts such as reinforcing profiles, guiding profiles, stacking profiles, hinge parts, pockets, label holders, profiles or holes for automatic handling, locking devices or the like.

The solid outer layer is then manufactured by;

a, i) injecting an amount of molten thermoplastic material A into the mould cavity of a mould, which molten thermoplastic material is allowed to solidify somewhat closest to the walls of the mould cavity. A pressurised gas is hereafter injected into the molten thermoplastic material so that a gas cavity surrounded by thermoplastic material is formed in the mould cavity. The thermoplastic material is allowed to solidify further after which the gas in the cavity is ventilated and a twin-walled, hollow article is obtained.

The solid outer layer is alternatively manufactured by;

a, ii) extruding a molten thermoplastic material A into a sheet or tube shaped work piece. The work piece is applied in a mould for vacuum forming and/or blow moulding while still in a molten or semi-molten state. The mould cavity of the mould forms at least the main features of the article by forcing the work piece towards the shape-giving walls of the mould cavity by means of gas pressure and/or vacuum. The outer skin of a hollow, twin-walled article is hereby formed.

The intermediate expanded layer is manufactured by;

b, i) injecting a second amount of molten thermoplastic material B, to which material an expanding agent has been added, into the hollow space. The thermoplastic materials A and B are allowed to solidify completely, whereby a laminate is formed. The laminate is composed of a first and a second layer of solid thermoplastic material A and an intermediate layer of expanded thermoplastic material B with an average density of 50–800 kg/m$^3$.

The intermediate expanded layer is alternatively manufactured by;

b, ii) adding a further molten thermoplastic material A and a molten thermoplastic material B, to which material B an expanding agent has been added, to the so-called work piece which forms a first layer. The further thermoplastic material A and the expanded material B are applied to the first layer by extrusion, preferably together with the extrusion of the first layer. A laminate is hereby formed, which laminate comprises a first and a second layer of a solid thermoplastic material A and an intermediate layer of an expanded thermoplastic material B with an average density of 50–800 kg/m$^3$. The layers, together, forms the tube or sheet shaped work piece. The work piece is applied in the mould for vacuum forming and/or blow moulding, preferably while still in a molten or semi-molten state. The mould cavity of the mould form at least the main features of the article by forcing the work piece towards the shape-giving walls of the mould cavity by means of low gas pressure and/or vacuum.

The functional part are integrated with the article by;

c, i) providing the mould cavity of the mould with pre-produced functional parts. The parts are preferably made of a material, compatible to, or the same as, the thermoplastic materials A and B. The pre-produced functional parts are applied in pockets in the mould cavity. The pockets are intended to receive the functional parts The functional parts confound with, or are mechanically bonded to, the main part of the article consisting of the material of the work piece.

The functional part are alternatively integrated with the article by;

c, ii) providing the mould cavity of the mould with special cavities which are negative depictions of the functional parts. The special cavities are filled with a molten thermoplastic material C by means of a hot runner system arranged in the mould whereby the functional parts are formed. The functional parts confound with, or are mechanically bonded to, the main part of the article consisting of the material of the work piece.

The functional part are alternatively integrated with the article by;

c, iii), providing the mould cavity of the mould with special cavities which are negative depictions of the functional parts and movable mould members placed on the opposite side of the mould cavity. The movable mould members force the still soft thermoplastic material into the special cavities in connection to the forming of the main features of the article. Functional parts integrated with the article are hereby formed.

The functional part are alternatively integrated with the article by;

c, iv) providing the article with pre-produced functional parts after removing the article from the mould. The functional parts are joined with the article by being screwed, riveted, glued, welded or snap-in joined.

The functional part are alternatively integrated with the article by;

c, v) providing the mould cavity of the mould, where the main features of the article is manufactured, with special cavities. The special cavities are negative depictions of the functional parts. The molten work-piece is forced towards the surfaces of the mould cavity and into the special cavities by means of high pressure and possibly vacuum so that the skin of a hollow twin-walled article with integrated functional parts is formed.

The functional part are alternatively integrated with the article by;

c, vi) providing the mould with special cavities which are negative depictions of the functional parts so that pressurised injected molten thermoplastic material is forced into the special cavities when injected into the mould cavity. The thermoplastic material is allowed to solidify somewhat closest to the walls of the mould cavity before a pressurised gas is injected into the mould so that a hollow space, surrounded by thermoplastic material, is formed in the mould cavity. The hollow space is hereafter filled with expanded thermoplastic material.

According to one embodiment of the invention the article is suitably manufactured by a process including the three steps;

Manufacturing of a first and a second layer which together form a solid skin of an thermoplastic material A.

Integration of functional parts.

Manufacturing of an intermediate layer made from an expanded thermoplastic material B.

The process is initiated by injecting an amount of molten thermoplastic material A into the mould cavity of a mould. The thermoplastic material is allowed to solidify somewhat closest to the surface of the mould cavity after which a pressurised gas is injected into the molten material. A gas cavity surrounded by thermoplastic material is hereby formed in the mould cavity. The thermoplastic material is allowed to solidify further, after which the gas is ventilated from the cavity and a hollow, twin-walled article is formed.

The mould cavity, where at least the main features of the article is manufactured can suitably be provided with special cavities. These special cavities are negative depictions of functional parts. The molten thermoplastic material, which is injected into the mould cavity under pressure, is allowed to enter said special cavities as well. Functional parts which are integrated with article are hereby formed. It is, of course possible to integrate pre-produced functional parts with the article after the moulding procedure by gluing, screwing or welding them on to the article. It is, however, advantageous if the functional parts can be integrated with the article in the mould since the manufacturing tolerances will be better as well as an extra working operation will be cancelled.

The intermediate expanded layer i manufactured by injecting a second amount of thermoplastic material B into the hollow space. An expanding agent is added to the material prior to the injection. The thermoplastic materials A and B are then allowed to solidify completely. A laminate is hereby manufactured, which laminate is composed of a first and a second layer of a solid thermoplastic material A and an intermediate layer of an expanded thermoplastic material B with an average density of 50–800 kg/m$^3$. The filling with expanded material is advantageously made while the article is still in the mould.

According to an alternative procedure, an article according to the invention is manufactured according to a process including the three steps;

Manufacturing of a first and a second layer which together form a solid skin of a thermoplastic material A.

Manufacturing of an intermediate layer made from an expanded thermoplastic material B Integration of functional parts.

The process is initiated by extruding a molten thermoplastic material A into a tube or sheet shaped work piece. The work piece is then applied in a mould for vacuum forming and/or blow moulding, preferably while the material in the work piece is still in a molten or semi-molten state. The mould provides the main features of the article by forcing the work piece towards the shape-giving surfaces of the mould by means of gas pressure and/or vacuum. The skin of a twin-walled hollow article is hereby formed.

Functional parts can, to a certain extent, be made already here by providing the mould with special cavities which are negative depictions of functional parts in addition to the main features. The molten work piece is under influence of a high gas pressure and possibly a vacuum forced towards the shape-giving surfaces of the mould and into the special cavities. The mould can alternatively be provided with pre-produced functional parts prior to the initiation of the moulding procedure. These functional parts are preferably manufactured from a material compatible with, or the same as, the thermoplastic materials A and B. The pre-produced functional parts are applied in special pockets in the mould cavity whereby they will confound with, or are mechanically bonded to, the material of the work piece, in connection to the forming of the main features of the article.

According to yet another alternative, the mould is provided with special cavities which are negative depictions of the functional parts and movable mould members placed on the opposite side of the mould cavity. The movable mould members locally force the still soft thermoplastic material into the special cavities in connection to the forming of the main features of the article. Functional parts integrated with the article are hereby formed. It is, of course possible to integrate pre-produced functional parts with the article after the moulding procedure by gluing, screwing or welding them on to the article. It is, however, advantageous if the functional parts can be integrated with the article in the mould since the manufacturing tolerances will be better as well as an extra working operation will be cancelled.

The intermediate expanded layer i manufactured by injecting a second amount of thermoplastic material B into the hollow space. An expanding agent is added to the material prior to the injection. The thermoplastic materials A and B are then allowed to solidify completely. A laminate is hereby manufactured, which laminate is composed of a first and a second layer of a solid thermoplastic material A and an intermediate layer of an expanded thermoplastic material B with an average density of 50–800 kg/m$^3$. The filling with expanded material is advantageously made while the article is still in the mould.

According to yet another procedure, an article according to the present invention is manufactured through a process including the three steps;

Manufacturing of a first and a second layer which together form a solid skin of a thermoplastic material A.

Manufacturing of an intermediate layer made from an expanded thermoplastic material B Integration of functional parts.

The alternative procedure is initiated by melting the thermoplastic materials A and B. An expanding agent has been added to the material B. The two materials are extruded into a tube or sheet shaped work piece so that the thermoplastic material B is on both sides surrounded by the thermoplastic material A. The work piece is then applied in a mould for vacuum forming and/or blow moulding, preferably while the material in the work piece is still in molten or semi-molten state. At least the main features of the article is manufactured in the mould by forcing the work piece towards the shape-giving surfaces of the mould by means of a low gas pressure and/or vacuum. The skin of a twin-walled hollow product is hereby obtained. The thermoplastic material B is provided with an expanding agent so that the average density of the intermediate layer lies within the range 50–800 kg/m$^3$.

Foundations for functional parts are then manufactured by locally pressing the still soft thermoplastic material together. The intermediate layer will hereby be compressed or densified so that the first and the second layer together with the intermediate layer form one or more local, solid parts. The densified parts correspond with the parts where the functional parts are to be applied or, constitute functional parts per se. The article can also be provided with functional parts by providing the mould with special cavities which are negative depictions of the functional parts. The special cavities are filled with a molten thermoplastic material C via a hot runner system in the mould. Functional parts will hereby take form in the mould, which functional parts will confound with the rest of the article. The thermoplastic material C is suitably injected with a low pressure, to counteract an unintended collapse of the intermediate expanded layer. This can be achieved by injecting the thermoplastic material C through a branched hot runner which is provided with a number of valves in connection to the mould cavity. The valves are opened as the special cavities are filled so that the cavities are sequentially filled. The thermoplastic materials A, B and C are compatible with each other, preferably the same thermoplastic material. The mould cavity of the mould can also be provided with special cavities which are negative depictions of the functional parts and movable mould members placed on the opposite side in the mould. The movable mould members will locally force the still soft thermoplastic material into the special cavities in connection to the manufacturing of the main features of the article. Functional parts integrated with the article will hereby be obtained.

The mould cavity of the mould can alternatively be provided with pre-produced functional parts prior to the initiation of the-moulding procedure. These functional parts are preferably made from the same, or a material compatible to the thermoplastic materials A and B. The pre-produced functional parts are applied in pockets, intended to receive the functional parts, in the mould cavity. The functional parts will hereby confound with, or be mechanically bonded to the material in the work piece in connection to the manufacturing of main features of the article. It is, of course possible to integrate pre-produced functional parts with the article after the moulding procedure by gluing, screwing or welding them on to the article. It is, however, advantageous if the functional parts can be integrated with the article in the mould since the manufacturing tolerances will be better as well as an extra working operation will be cancelled.

According to one embodiment of the invention, foundations for functional parts are manufactured by locally pressing the still soft thermoplastic material together. The intermediate layer will hereby be compressed or densified so that the first and the second layer together with the intermediate layer form one or more local, solid parts. The densified parts corresponds with the parts where the functional parts are to be applied or, constitute functional parts per se.

Functional parts can suitably be manufactured by injecting a molten thermoplastic material C under a low pressure. This is suitably achieved by injecting the thermoplastic material C through a branched type of a hot runner system, provided with a number of valves in connection to the mould cavity. The valves are opened as the special cavities are filled so that the cavities are sequentially filled.

The thermoplastic materials A, B and C are compatible with each other, preferably constitute the same thermoplastic material. The thermoplastic materials A and C can for example be constituted by a high-density polyethylene while the thermoplastic material B is constituted by a low-density polyethylene or a re-cycled polyethylene.

What is claimed is:

1. A process for the manufacturing of a hollow article made of plastic comprising a solid outer layer with an intermediate expanded layer and a functional part selected from the group consisting of reinforcing profiles, guiding profiles, stacking profiles, hinge parts, pockets, label holders and profiles for automatic handling and locking, the process comprising:

extruding a first thermoplastic material into a sheet or tube shaped work piece forming a first layer;

adding further molten first thermoplastic material, molten second thermoplastic material and an expanding agent to the work piece by extrusion to form a laminate comprising a first and a second layer of solid first thermoplastic material and an intermediate layer of an expanded second thermoplastic material with an average density of 50–800 kg/m$^3$ which together forms the tube or sheet shaped workpiece;

shaping the workpiece by at least one method selected from the group consisting of vacuum forming and blow molding in a mold having a mold cavity with special cavities which cavities are negative depictions of the functional part, by means of at least one selected from the group consisting of gas pressure and vacuum;

filling the special cavities with a molten third thermoplastic material to form the functional part; and integrating the functional part with the remainder of the article.

2. A process according to claim 1, further comprising:

pressing the laminate together locally while the thermoplastic materials are still soft so that the intermediate layer is compressed or densified, and forming one or more solid sections conforming with sections to which the functional part is to be applied.

3. A process according to claim 1, comprising injecting the third thermoplastic material under low pressure to form the functional part.

4. A process according to claim 3, comprising injecting the third thermoplastic material through a branched hot runner system which is provided with a number of valves in connection to the mold cavity, which valves are sequentially opened as a plurality of functional parts are filled with molten third thermoplastic material so that the functional parts are sequentially filled to form the functional parts.

5. A process according to claim 1, wherein the first, second and third thermoplastic materials are of compatible thermoplastic materials.

6. A process according to claim 5, wherein the first, second and third thermoplastic materials are the same thermoplastic material.

7. A process according to claim 1, wherein the first layer is co-extruded in the adding step.

8. A process according to claim 1, wherein the first thermoplastic material, second plastic material and third thermoplastic material are independently selected from the group consisting of polyethylene, polypropylene, polybutene, polyvinylchloride, polyalkylene-terephthalate, polystyrene, and acrylonitrile-butadiene-styrene co-polymer.

9. A process according to claim 1, wherein said integrating comprises at least one of injection molding, press molding, welding, confounding, screwing, riveting, gluing, and snap-in joining.

10. A process according to claim 1, wherein the first thermoplastic material comprises high-density polyethylene, the second thermoplastic material comprises a material selected from the group consisting of low-density polyethylene and re-cycled polyethylene and the third thermoplastic material comprises high-density polyethylene.

11. A process according to claim 1, wherein the integration is performed while the article is in the mold.

12. A process according to claim 1, wherein the filling is performed while the article is in the mold.

13. A process for the manufacturing of a hollow article made of plastic comprising a solid outer layer with an intermediate expanded layer and a functional part selected from the group consisting of reinforcing profiles, guiding profiles, stacking profiles, hinge parts, pockets, label holders and profiles for automatic handling and locking, the process comprising:

extruding a first thermoplastic material into a sheet or tube shaped work piece forming a first layer;

adding further molten first thermoplastic material, molten second thermoplastic material and an expanding agent to the work piece by extrusion to form a laminate comprising a first and a second layer of solid first thermoplastic material and an intermediate layer of an expanded second thermoplastic material with an average density of 50–800 kg/m$^3$ which together forms the tube or sheet shaped workpiece;

shaping the workpiece by at least one method selected from the group consisting of vacuum forming and blow molding in a mold having a mold cavity by means of at least one selected from the group consisting of gas pressure and vacuum;

providing the mould cavity with pre-produced functional parts, wherein the functional parts are applied in pockets in the mould cavity; and integrating the functional parts with the remainder of the article.

14. A process according to claim 13, wherein the providing comprises filling the mould cavity with a third thermoplastic material.

15. A process according to claim 14, wherein the first, second and third thermoplastic materials are of compatible thermoplastic materials.

16. A process according to claim 15, comprising injecting the third thermoplastic material through a branched hot runner system which is provided with a number of valves in connection to the mold cavity, which valves are sequentially opened as a plurality of functional parts are filled with molten third thermoplastic material so that the plurality of functional parts are sequentially filled to form the functional parts.

17. A process according to claim 14, wherein the first, second and third thermoplastic materials, are the same thermoplastic material.

18. A process according to claim 14, wherein the first thermoplastic material, second plastic material and third thermoplastic material are independently selected from the group consisting of polyethylene, polypropylene, polybutene, polyvinylchloride, polyalkylene-terephthalate, polystyrene, and acrylonitrile-butadiene-styrene co-polymer.

19. A process according to claim 13, wherein the first thermoplastic material comprises high-density polyethylene, the second thermoplastic material comprises a material selected from the group consisting of low-density polyethylene and re-cycled polyethylene and the third thermoplastic material comprises high-density polyethylene.

20. A process according to claim 13, further comprising:
pressing the laminate together locally while the thermoplastic materials are still soft so that the intermediate layer is compressed or densified, and
forming one or more solid sections conforming with sections to form the functional parts.

21. A process according to claim 13, wherein the first layer is co-extruded in the adding step.

22. A process according to claim 13, wherein said integrating comprises at least one of injection molding, press molding, welding, confounding, screwing, riveting, gluing, and snap-in joining.

23. A process according to claim 13, wherein the integration is performed while the article and the functional part are in the mold.

* * * * *